US008568653B2

(12) United States Patent
Thillen et al.

(10) Patent No.: US 8,568,653 B2
(45) Date of Patent: Oct. 29, 2013

(54) SEALING VALVE ARRANGEMENT FOR A SHAFT FURNACE CHARGING INSTALLATION

(75) Inventors: Guy Thillen, Diekirch (LU); Jeannot Loutsch, Mondercange (LU); Patrick Hutmacher, Bettembourg (LU); Frédéric Parasch, Dudelange (LU)

(73) Assignee: Paul Wurth S.A. (FR)

( * ) Notice: Subject to any disclaimer, the term of this patent is extended or adjusted under 35 U.S.C. 154(b) by 46 days.

(21) Appl. No.: 13/379,725

(22) PCT Filed: Jul. 5, 2010

(86) PCT No.: PCT/EP2010/059544
§ 371 (c)(1),
(2), (4) Date: Dec. 21, 2011

(87) PCT Pub. No.: WO2011/000966
PCT Pub. Date: Jan. 6, 2011

(65) Prior Publication Data

US 2012/0091378 A1 Apr. 19, 2012

(30) Foreign Application Priority Data

Jul. 3, 2009 (LU) ........................................ 91 583

(51) Int. Cl.
*F16K 31/44* (2006.01)

(52) U.S. Cl.
USPC ............ 266/199; 266/197; 414/199; 414/206

(58) Field of Classification Search
USPC ................. 266/197, 199, 176, 177, 184, 187; 414/199, 206
See application file for complete search history.

(56) References Cited

U.S. PATENT DOCUMENTS

| | | | | |
|---|---|---|---|---|
| 4,071,166 A | 1/1978 | Legille | | |
| 4,514,129 A | 4/1985 | Legille | | |
| 4,755,095 A | 7/1988 | Mailliet | | |
| 2011/0135425 A1* | 6/2011 | Thillen et al. | ................. | 414/199 |
| 2011/0182700 A1* | 7/2011 | Rizzuti et al. | ................. | 414/199 |
| 2011/0274519 A1* | 11/2011 | Rizzuti et al. | ................. | 414/206 |

FOREIGN PATENT DOCUMENTS

EP 2000547 A2 12/2008

OTHER PUBLICATIONS

International Search Report PCT/EP2010/059544; Dated Sep. 2, 2010.

(Continued)

*Primary Examiner* — Scott Kastler
(74) *Attorney, Agent, or Firm* — Cantor Colburn LLP

(57) ABSTRACT

A sealing valve arrangement for a shaft furnace charging installation includes a shutter-actuating device for moving a shutter between a closed position in sealing contact with a valve seat and an open position remote from the valve seat. The shutter-actuating device is of the dual-motion type and includes a primary tilting arm on a first tilting shaft defining the first axis and is equipped with bearings supporting the primary tilting arm. A secondary tilting arm carries the shutter is connected to a second tilting shaft that defines a second substantially parallel axis and has bearings that support the secondary tilting arm on the primary tilting arm. The shutter-actuating device has a mechanism configured to tilt the secondary tilting arm when the primary tilting arm is tilted. The first tilting shaft is configured as hollow sleeve shaft and the shutter-actuating device includes a reference rod extending through the first tilting shaft.

20 Claims, 4 Drawing Sheets

(56) References Cited

OTHER PUBLICATIONS

International Preliminary Report on Patentability; International Application No. PCT/EP2010/059544; International Application filing date Jul. 5, 2010; Date of Issuance of report Feb. 12, 2012.

Written Opinion; International Application No. PCT/EP2010/059544; International Application filing date Jul. 5, 2010; Mail date Sep. 2, 2010.

* cited by examiner

SEALING VALVE ARRANGEMENT FOR A SHAFT FURNACE CHARGING INSTALLATION

TECHNICAL FIELD

The present invention generally relates to a sealing valve arrangement for a shaft furnace charging installation and more specifically to an upper or lower sealing valve arrangement for preventing furnace gas loss in a blast furnace charging installation.

BRIEF DESCRIPTION OF RELATED ART

Shaft furnace charging installations of the BELL LESS TOP® type have found widespread use in industry during the last decades. An early example of such an installation is disclosed e.g. in U.S. Pat. No. 4,071,166. This installation minimizes escape of blast furnace gas from the furnace throat by operating one or more intermediate charge material storage hoppers in the manner of a sluice or airlock. To this effect, each hopper has an upper sealing valve and a lower sealing valve for sealing closure of the hopper inlet and outlet respectively. During filling of the hopper, the upper sealing valve is open whilst the lower sealing valve is closed. When material is charged from the hopper into the furnace, the lower sealing valve is open whilst the upper sealing valve is closed. U.S. Pat. No. 4,071,166 discloses a commonly used sealing valve arrangement with a flap-type valve, in which the shutter is tiltable about a single shaft. The axis of this shaft is arranged approximately on the plane of the valve seat. Since the shutter has to be completely removed from the material flow path in the open position, the arrangement according to U.S. Pat. No. 4,071,166 requires considerable space in the vertical direction, both inside the lower sealing valve housing and inside each intermediate storage hopper (see e.g. FIG. 1 of this patent). In other words, this valve arrangement requires a certain free height inside the sealing valve housing and limits the maximum filling height of the hoppers.

In order to reduce "lost" vertical constructional space, improved "dual-motion" shutter-actuating devices have been proposed. U.S. Pat. No. 4,514,129 proposes such a dual-motion shutter-actuating device. This device is configured to tilt the valve about a first axis and to separately pivot the shutter together with its mounting arm about a second axis that is perpendicular to the first axis. This dual-motion shutter-actuating device allows moving the shutter into a higher parking position located laterally of and partially above the seat. The valve arrangement according to U.S. Pat. No. 4,514,129 thereby considerably reduces the required constructional height. U.S. Pat. No. 4,755,095 discloses a similar shutter-actuating device in an upper sealing valve arrangement, i.e. for sealing the inlet of the hopper. A drawback of these types of shutter-actuating devices however lies in that they require an additional second actuator when compared to flap-type valves.

In order to reduce required constructional height without using an additional actuator, European patent application EP 2000547 discloses an alternative lower valve arrangement for a charging installation. This arrangement also has a dual-motion shutter-actuating device for moving the shutter between a closed position in sealing contact with the valve seat and an open position remote from the valve seat. However, this actuating device is configured to confer to the shutter a superposition of two rotations about two offset axes that are parallel. To this effect, the actuating device has a primary tilting arm that rotatably supports a secondary tilting arm. The primary tilting arm has a combined L-U shape and is connected on opposite sides of the seat to one of two first tilting shafts that define a first axis and rotatably support the primary tilting arm on the valve housing. The secondary tilting arm, which carries the shutter, is generally U-shaped and connected on opposite sides of the valve seat to one of two second tilting shafts that define the parallel second axis and rotatably support the secondary tilting arm on the primary tilting arm. In order to superpose two parallel rotations onto the shutter by means of a single actuator, the arrangement according to EP 2000547 is further equipped with a mechanism configured to tilt the secondary tilting arm about the second axis as the primary tilting arm is tilted about the first axis. To this effect, each of the shorter sides of the U-shaped secondary arm is further rotatably connected, to one of two connecting rods, which in turn are rotatably connected to the stationary valve housing. On either side, the first tilting shaft, the second tilting shaft and the two rotary connections of the respective connecting rod form, in combination with both arms and the connecting rods as links, form a four-bar linkage that is configured to confer to the shutter a primary rotation and a superposed secondary rotation by means of a single actuator.

Even though it enables dual-motion by means of a single actuator, major drawbacks of the arrangement according to EP 2000547 reside in susceptibility to misalignment and a cumbersome installation and removal procedure, e.g. for repair or replacement. In fact, misalignment between the two groups of rotation axes on either side of the valve seat and in between the axes of each group can occur, e.g. due to asymmetrical thermal dilatation of the valve housing or due to improper machining. Such misalignment could lead to premature wear, insufficient sealing contact between the shutter and the seat, and even to complete blockage or jamming of the shutter-actuating device.

BRIEF SUMMARY

In view of the above, the invention provides a sealing valve arrangement with a dual-motion shutter-actuating device that is less prone to jamming and that allows for less time-consuming installation and removal.

The present invention relates to a lower or upper sealing valve arrangement for charging installation of a shaft furnace, in particular of a blast furnace. The arrangement comprises a shutter that cooperates with a valve seat and a dual-motion shutter-actuating device for moving the shutter between a closed position in sealing contact with the valve seat and an open position remote from the valve seat.

The shutter-actuating device is of the type configured to confer to the shutter a superposition of two rotations about substantially parallel and offset axes, i.e. offset axes having a relative orientation closer to parallel than to perpendicular. To this effect, the device comprises

- a primary tilting arm supported on a first tilting shaft, which is equipped with bearings to rotatably support the primary tilting arm on a stationary structure, typically either a lower sealing valve housing or on the shell of an intermediate storage hopper, in rotatable manner about an immobile first axis;
- a secondary tilting arm that carries the shutter and is supported on a second tilting shaft, which is equipped with bearings that rotatably support the secondary tilting arm on the primary tilting arm, in rotatable manner about a second axis that is essentially parallel to the first axis and moves with the secondary tilting arm; and a mechanism configured to impart rotation about the second axis to the secondary tilting arm at the same time as the primary tilting arm rotates about the first axis;

To achieve the aforementioned, the proposed invention is characterized in that the first tilting shaft is configured as hollow sleeve shaft and the shutter-actuating device comprises a reference rod that extends through the first tilting shaft and is preferably coaxially supported in the latter. This reference rod has a distal end portion to be connected to a stationary structure and a proximal end portion with a reference member. The proximal end portion of the rod itself may form the reference member or, equivalently, it may have a dedicated reference member mounted thereon. The reference member at the proximal end portion serves as stationary kinematic reference frame to the mechanism that imparts rotation about the second axis to the secondary tilting arm while the primary tilting arm rotates. Accordingly, the mechanism has a driven side that is in engagement with the reference member.

By virtue of the coaxial arrangement of the hollow first tilting shaft and the reference rod, only one opening needs to be precisely machined in the fixed structure, e.g. the lower sealing valve housing or the hopper shell. Furthermore, thermally induced deformation of the structure on which the shutter-actuating device is supported can no longer cause jamming because all axes are maintained parallel and at proper distances by the device itself, independently of the supporting structure. Moreover, the shutter-actuating device can be handled as a single unit during installation and maintenance.

In a cost and space saving embodiment, the primary and secondary tilting arms are both cantilever arm. They are thus supported, at one end portion only, the secondary arm by the second tilting shaft and the primary tilting arm by the first tilting shaft. In a mechanically stable and reliable configuration, the reference rod is a cylindrical shaft supported coaxially inside the hollow first tilting shaft, preferably by means of two axially spaced bearings.

In a preferred embodiment of the mechanism that imparts rotation to the secondary tilting arm, this mechanism has a driving side in engagement with the second tilting shaft for imparting rotation to the secondary tilting arm about the second axis, with the secondary tilting arm being fixed in rotation onto the second tilting shaft. Preferably, the mechanism is enclosed in a casing supported on the primary arm. In this embodiment, the second tilting shaft is arranged to pass through a bore in the primary tilting arm or in the casing. This bore is equipped with a seal that seals the interior of the casing against the outside. The latter configuration reliably protects the rotating mechanism, which is typically exposed to a severe atmosphere.

In a simple an reliable embodiment of the mechanism, the second tilting shaft is configured as a crankshaft and the mechanism comprises a connecting rod connected at one end to the crankshaft for imparting rotation to the secondary tilting arm. At the other end, the connecting rod may for instance engage an eccentric pivot on the stationary reference member. It may also have a cam follower pin guided in a cam groove in the reference member. The cam groove preferably has a contour that the distance between the cam follower pin and the first axis during an initial phase of motion from the closed to the open position. The latter embodiment enables lifting the shutter in nearly axially from the valve seat during the initial phase of motion when opening and the final phase when closing. In this embodiment, the mechanism preferably has a linear guide maintaining the cam follower pin in engagement in the reference cam groove and guiding the second end portion of the connecting rod so as to constrain motion of the cam follower pin relative to the primary tilting arm to a linear motion.

Alternatively, instead of linkage type designs, the mechanism may be based on a wheel-type drive. Accordingly, the mechanism may have a driven wheel fixed coaxially to the second axis on the second tilting shaft and a driving wheel fixed coaxially to the first axis on the reference member. The mechanism can be configured as gearwheel drive or as belt/chain drive.

As will be understood, the proposed arrangement allows operating the valve using a single actuator only. The latter is preferably connected to the first tilting shaft for imparting rotation about the first axis to the primary tilting arm.

The primary tilting arm may be fork-shaped with two spaced-apart elongated parallel plates, each supporting one of two axially spaced bearings of the second tilting shaft, the mechanism being arranged in between the two plates. The secondary tilting arm can be L-shaped with a first end portion that is fixed in rotationally stiff manner to the second tilting shaft and a second end portion equipped with a globe joint through which the shutter is mounted to the secondary tilting arm.

As will be understood, the proposed valve arrangement can be used especially as a lower sealing valve downstream of a bell-less Top® type charging installation of a blast furnace. However, the design is equally applicable as an upper sealing valve at the inlet of an intermediate storage hopper of such installation.

The person skilled in the art will readily understand that the present patent application contains support for the definition of other inventions, which could be claimed independently e.g. as subject matter of claims in divisional and/or continuation applications. Such subject matter can be defined by any combination of features disclosed herein that provides a novel and inventive solution.

BRIEF DESCRIPTION OF THE DRAWINGS

Further details and advantages of the present invention will be apparent from the following detailed description of several not limiting embodiments with reference to the attached drawings, wherein.

Identical reference signs are used to identify identical or similar parts throughout the drawings.

DETAILED DESCRIPTION

Figure 1:
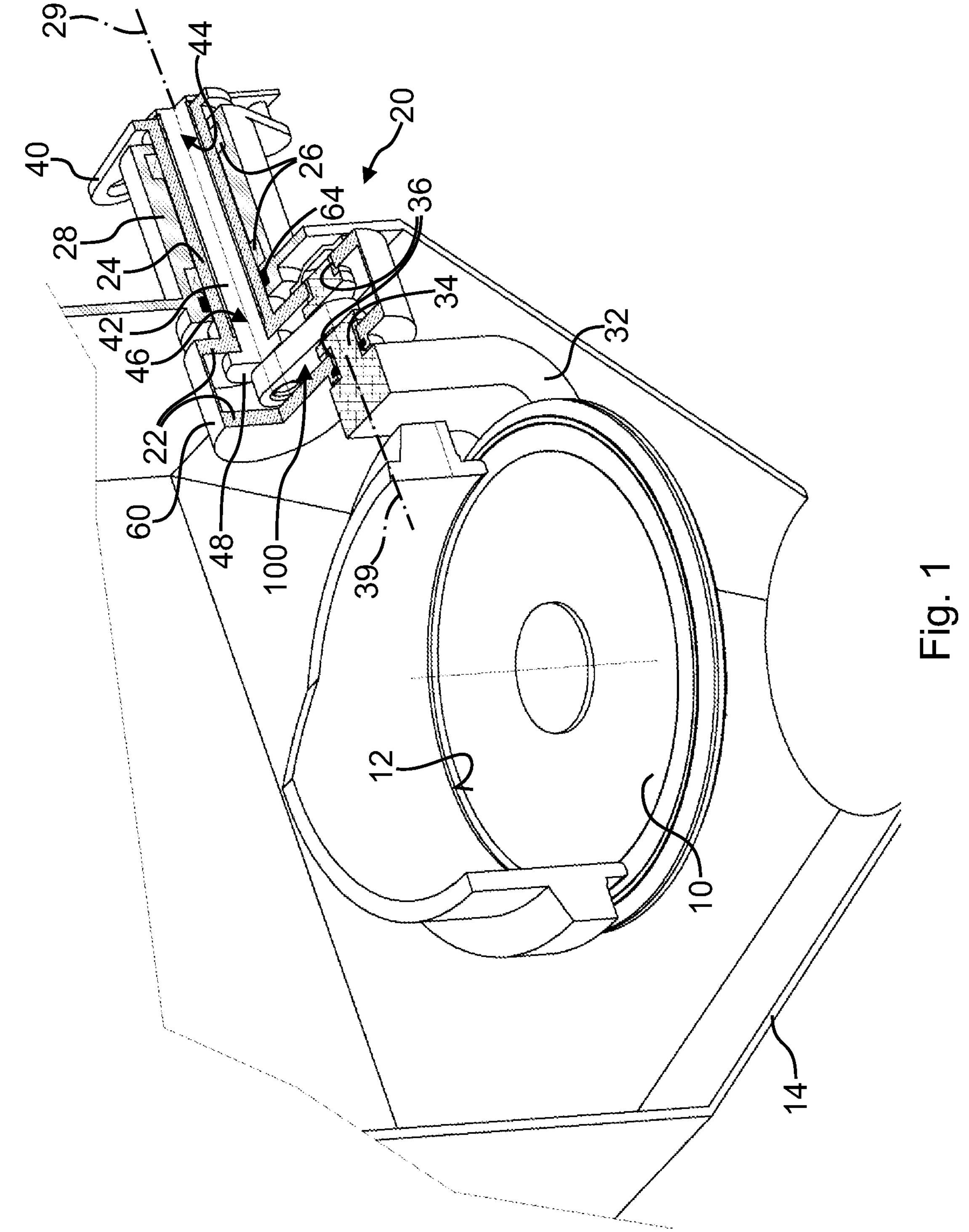
FIG. 1 is a perspective view in partial section, illustrating a first embodiment of a sealing valve arrangement.
Figure 2:
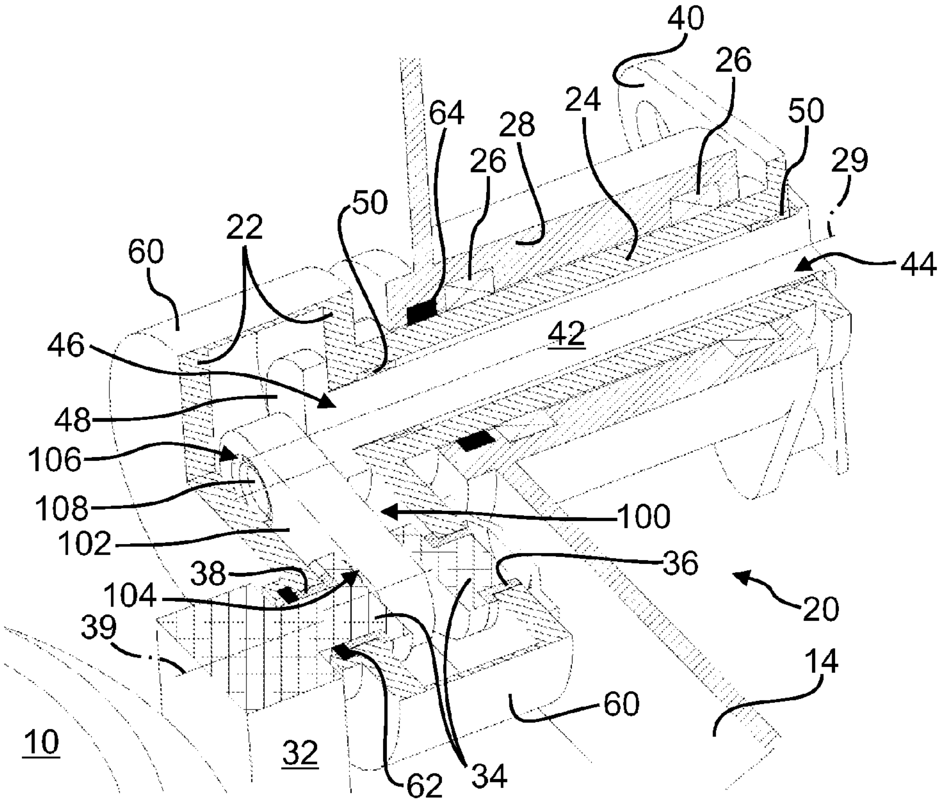
FIG. 2 is an enlarged perspective view in partial section, illustrating in more detail a dual-motion shutter-actuating device as shown in FIG. 1.
Figure 3:
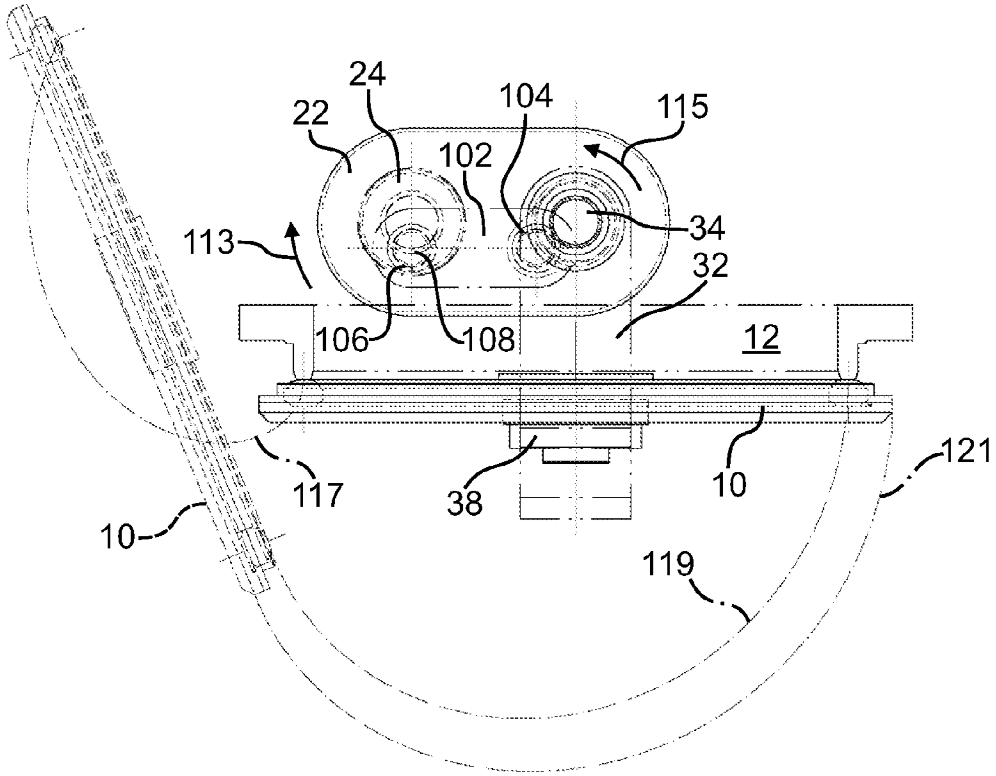
FIG. 3 is vertical cross-sectional view illustrating the trajectory of outer portions of the shutter member as produced by the dual-motion shutter-actuating device of FIGS. 1-2.

FIGS. 1-3 illustrate a first embodiment of sealing valve arrangement for a shaft furnace charging installation, in particular a blast furnace charging installation. The arrangement has a disc-shaped shutter 10 (closure member) that cooperates with a conical valve seat 12 for gas-tight closure. In this embodiment, the valve seat 12 is arranged on the lower end of a tubular channel that typically communicates, via a material gate valve, with the lower outlet of an intermediate storage hopper (not shown). Accordingly, in FIGS. 1-3, the valve seat 12 and the shutter 10 are arranged in a funnel shaped lower sealing valve housing 14 the outlet of which feeds material to a charge material distribution device. As will be understood, the presently proposed arrangement can equally be used as an upper sealing valve arrangement for sealing the inlet of an intermediate storage hopper (not shown). FIGS. 1-3 show the closed position, in which the shutter 10 is in sealing contact with the valve seat 12. In the open position as shown by dashed lines on the left-hand side of FIG. 3, the shutter 10 is located in a lateral parking space between the tubular channel and the casing 14, i.e. to the side of and partially above the valve seat 12.

For moving the shutter 10 from the closed position of FIGS. 1-3 into an open position remote from the valve seat 12 and vice-versa, the arrangement comprises dual-motion shutter-actuating device 20. The shutter-actuating device 20 comprises a fork-shaped primary tilting arm 22 that is fixed to a first tilting shaft 24. The first tilting shaft 24 is rotatably supported, by means of a pair of external axially spaced roller bearings 26, inside a hollow cylindrical support 28 that is attached to the housing 14. Accordingly, the first tilting shaft 24 defines a first tilt axis 29 and rotatably supports the primary tilting arm 24 on a stationary structure, which in case of FIGS. 1-3 is the lower sealing valve housing 14. The first tilt axis 29 is essentially parallel to the plane of the valve seat 12. The shutter-actuating device 20 further comprises an L-shaped secondary tilting arm 32 that is fixed, at a first end portion, in rotationally stiff manner to a second tilting shaft 34. The second tilting shaft 34 is rotatably supported, by means of a pair of axially spaced roller or plain bearings 36, which are mounted in coaxial bores in the oblong elongated plates or flanges of the fork-shaped primary tilting arm 22, which are rigidly interconnected to be spaced-apart and parallel. Accordingly, the second tilting shaft 34 rotatably supports the secondary tilting arm 32 on the primary tilting arm 22 and defines a second tilt axis 39. Whereas the first tilt axis 29 is fixed with respect to the housing 14 (or the hopper), the second tilt axis 39 moves with the secondary tilting arm 32. It will be understood however that both tilt axes 29, 39 are kept substantially parallel and offset by a constant distance. Accordingly, the second tilt axis is also essentially parallel to the plane of the valve seat 12. As will be noted the tilt axes 29, 39, whilst preferably being technically parallel, need not necessarily be exactly parallel, slight unintentional or intentional constructional deviations, with small a angle of several degrees between the tilt axes 29, 39, e.g. up to 10°, being possible.

As best seen in FIG. 3, the secondary tilting arm 32 carries the shutter 10. Preferably, the secondary tilting arm 32 is equipped, at a second end portion, with a globe joint 38 through which the centre of the shutter 10 is mounted to the secondary tilting arm 32. Use of the globe joint 38 warrants sealing engagement of the shutter 10 on the valve seat 12 in case of minor misalignment between the first tilt axis 29 and the second tilt axis 39 and/or the plane of the valve seat 12. The shutter 10 is mounted so that its central axis is generally parallel to the upwardly extending portion of the L-shaped secondary tilting arm 32.

As will be appreciated, both tilting arms 22, 32 are configured as cantilever arms. More specifically, the primary tilting arm 22 is supported at only one of its end portions by the first tilting shaft 24 whereas the secondary tilting arm 32 is supported at only one of its end portions by the second tilting shaft 34. As opposed to a double-sided support, a cantilevered support of the shutter 10 considerably reduces the risk of jamming of the dual-motion shutter-actuating device 20. Moreover, installation and replacement are facilitated since the device 20 can be handled as a unit, additional space opposite to the vale seat 12 is gained and machining of the stationary support structure is minimized.

As seen in FIGS. 1-2, the first tilting shaft 24 has end distal from the valve seat 12 that is equipped with an actuating lever 40 to which the only single actuator of the arrangement (not shown), e.g. a linear hydraulic cylinder, is connected for driving the first tilting shaft 24 to tilt the primary tilting arm 22. In order to simultaneously tilt the secondary tilting arm 32 with respect to the primary tilting arm 22, the device 20 is equipped with a suitable mechanism that drives the secondary tilting arm 32 in rotation about the second axis 39 at the same time as the primary tilting arm 22 is driven to rotate about the first axis 29, i.e. without use of a second additional actuator. Several preferred examples of such mechanisms will be detailed further below with respect to FIGS. 2-3, FIG. 4, FIG. 5 and FIG. 6 respectively.

Considering FIGS. 1-2, it will be appreciated that the first tilting shaft 24 is configured as hollow sleeve shaft (also called quill shaft). As further apparent from FIGS. 1-2, the shutter-actuating device 20 comprises a cylindrical reference rod 42, e.g. a cylindrical shaft, that extends through the cylindrical space inside the first tilting shaft 24. The reference rod 42 has a protruding distal end portion 44 remote from the shutter 10. The end portion 44 allows connecting the reference rod 42 to a stationary structure. To this effect, any suitable link may be used, e.g. in the exemplary embodiment shown in FIGS. 1-3, a connecting plate or bracket connects the distal end portion 44 to the hollow cylindrical support 28 and thereby to the stationary lower sealing valve housing 14. The connection between the reference rod 42 and the stationary structure, e.g. the housing 14, may either be rigid or flexible to allow for slight axial and radial relative motion, e.g. for damping purposes and/or for actuating a limit stop switch (not shown). For example, the reference rod 42 and the stationary structure may be connected by means of any suitable type of abutment-restricted axial and rotational spring connection. In any case, this connection is however configured to allow only minor and limited relative movement between the reference rod 42 and the stationary structure, e.g. the housing 14. The reference rod 42 further has a proximal end portion 46, which protrudes beyond the hollow first tilting shaft 24 on the side of the shutter 10. A reference member 48 is rigidly fixed to this proximal end portion 46 of the reference rod 42. The reference member 48 may have any suitable form and will generally have greater transverse dimensions than the reference rod 42. As will be understood, the reference member 48, being connected to a stationary structure through the reference rod 42, does not rotate in unison with either of the tilting arms 22, 32. As best seen in FIG. 2, the cylindrical reference rod 42 is preferably maintained coaxial to axis 29 inside the sleeve-type first tilting shaft 24 by means of a pair of auxiliary bearings 50. The bearings 50 are axially spaced and may be plain or roller bearings. As will become apparent further below, even though possibly allowing minor limited axial and rotational displacement relative to the fixed structure, the reference member 48 thus provides a “fixed” reference frame (in the kinematic sense) for the driven side of the mechanism used for tilting the secondary tilting arm 32 about the second tilt axis 39 without additional actuator. The configuration of the reference rod 42 passing through the hollow first tilting shaft 24 warrants proper positioning of the reference member 48, i.e. the kinematic frame, with respect to the first tilt axis 29 and facilities replacement of the shutter-actuating device as a single unit.

A first variant of a mechanism 100 for taking advantage of rotation imparted to the primary tilting arm 22 to simultaneously tilt the secondary tilting arm 32 will now be detailed with respect to FIGS. 2-3. As best seen in FIG. 2, the second tilting shaft 34 is configured as a crankshaft (cranked shaft). The mechanism 100 comprises a connecting rod 102. A first end portion of the connecting rod 102 has a bushing by means of which the connecting rod 102 is rotatably connected to the crank of the second tilting shaft 34 by means of a first rotational joint 104 (see FIG. 3), e.g. a roller or plain bearing. At the opposite second end portion, the connecting rod 102 has another bushing by means of which it is rotatably connected, by means of a second rotational joint 106, to a reference pivot pin 108. The reference pivot pin 108 forms an eccentric that is rigidly fixed to the reference member 48 and located with an offset below the first tilt axis 29, e.g. vertically under the latter as illustrated in FIG. 3. Accordingly, the mechanism 100 has a driven side engaging the pivot pin 108 on the reference member 48 (as kinematic frame) and a driving side engaging the crank of the second tilting shaft 34.

Operation of the shutter-actuating device 20 is now briefly described with respect to FIG. 3. For moving the shutter 10 from the closed position (solid lines in FIG. 3) to the open position (dashed lines in FIG. 3) the primary tilting arm 22 tilts according to arrow 113 about the first tilt axis 29 (i.e. in clockwise sense for FIG. 3). During an first initial phase of the opening motion, the mechanism 100 simultaneously tilts the secondary tilting arm 32 about the second tilt axis 39 in the opposite sense according to arrow 115 (i.e. in anti-clockwise sense for FIG. 3). This is because the connecting rod 102 exerts a counter-acting torque onto the cranked second tilting shaft 34 due to the decreasing distance between the second tilt axis 39 and the central axis of the eccentric reference pivot pin 108. In other words, the mechanism 100 initially imparts to the shutter 10 a secondary rotation about the second tilt axis 39 in a direction opposite to the primary rotation about the first tilt axis 29. During a second final phase of the opening motion however, the mechanism 100 tilts the secondary tilting arm 32 about the second tilt axis 39 in the same sense of rotation as imparted to the primary tilting arm 22 (i.e. in clockwise sense for FIG. 3). The transition between the two phases occurs when the second tilt axis 39 passes a vertical plane through the axis of the reference pivot pin 108 (or second joint 106), where the distance between both axes is minimal. Once the second tilt axis 39 passes through this plane below the axis of the reference pivot pin 108, the distance between these axes starts to increase again so that the connecting rod 102 exerts a co-current torque onto the cranked tilting shaft 34 in the second phase. As will be understood, reverse motion occurs from the closed to the open position.

FIG. 3 further illustrates the trajectories (motion paths) 117, 119, 121 of three points of the shutter 10. The end of trajectory 117 indicates approximately where the highest portion of the shutter 10 is located in the open position. As seen in FIG. 3 the radius of curvature of trajectory 117 increases towards the open position. As seen in FIG. 3, the curvature of trajectories 119, 121 decreases towards the open position. The end of trajectory 121 shows where the lowermost point of the shutter 10 is located in the open position. It will be appreciated from FIG. 3, that the proposed dual-motion shutter-actuating device 20 moves the shutter 10 with two superposed rotations closely past the seat 12 and that, in the open position, the shutter 10 (as illustrated by dashed lines in FIG. 3) is located close to and partially above the seat 12, while being completely removed from the flow path thought the seat 12.

The locations of the tilt axes 29, 39, their corresponding rotation radius and the mechanism 100 are configured to minimize required motion space. As will be noted, the active length of the connecting rod 102 and the lever arm of the cranked second tilting shaft 34 are chosen so that the secondary rotation about axis 39 is slower than the primary rotation about axis 29. In particular, the active length of the connecting rod 102, i.e. the distance between the axes of its rotational joints 104, 106 is shorter than the constant distance between the titling axes 29, 39. In order to obtain an initially perpendicular motion of the shutter 10 away from the seat 12, the shutter-actuating device 10 is preferably configured so that the plane defined by the tilt axes 29, 39 is substantially parallel to the plane of the seat 12 as shown in FIG. 3. In practice, an inclination of at most 30° between both planes in the closed position may be tolerated. In the closed position of the mechanism illustrated in FIG. 3, the plane defined by the axes of the rotational joints 104, 106 is also parallel to the plane defined by the tilt axes 29, 39 and the second tilt axis 39 is coplanar with the central axis of the shutter 10, without these being a necessary criteria however.

Figure 4:
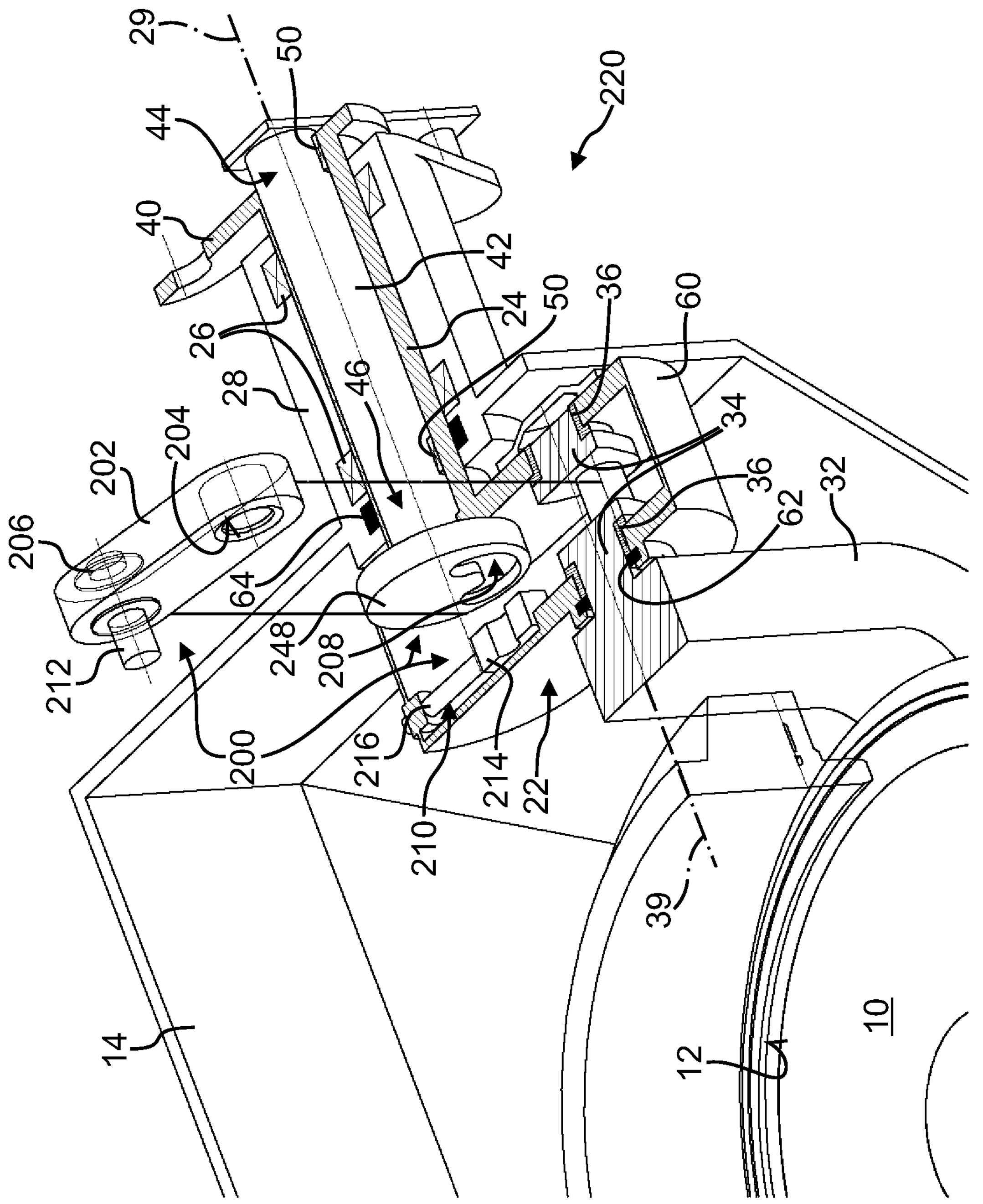
FIG. 4 is an enlarged perspective view in partial section and partially exploded, illustrating a second embodiment of a sealing valve arrangement that is equipped with an alternative dual-motion shutter-actuating device.

FIG. 4 illustrates a further embodiment of a dual-motion shutter-actuating device 220 that differs from that of FIGS. 1-3 mainly in the configuration of the kinematic frame supported by the reference rod 42, i.e. the reference member 248, and in the alternative configuration of its mechanism 200 for superposing secondary rotation to the secondary tilting arm 32. The description of other components and functions identical to those in FIGS. 1-3 will not be repeated. The mechanism 200 of FIG. 4 also comprises a connecting rod 202 equipped with a bushing and a bearing at its first end to form a rotational joint 204 on the crank of the second tilting shaft 34. At its opposite end however, the connecting rod 202 is provided with a cam follower pin 206 that is guided in a reference cam groove 208 machined into the reference member 248. In order to obtain an opening motion similar (not necessarily identical) to that of the embodiment of FIGS. 1-3, the cam groove 208 has a contour that increases the distance between the cam follower pin 206 and the fixed first tilt axis 29 during an initial phase of motion from the closed to the open position. Accordingly, during an initial phase of motion at least, the connecting rod 202 will exert a counter-acting torque onto the cranked second tilting shaft 34 to superpose a secondary rotation onto the shutter 10 that is opposite to the primary rotation about the first tilt axis 29. Although not shown in FIG. 4, the cam groove 208 may be continued along a mirrored contour, decreasing the distance between the cam follower pin 206 and the stationary first tilt axis 29 to obtain co-current tilting during a second phase. As further seen in FIG. 4, the mechanism 200 further comprises a linear guide 210 arranged on the primary tilting arm 22. The linear guide 210 is configured to maintaining the cam follower pin 206 in engagement in the reference cam groove 208 and to movably guide the second end portion of the connecting rod 202 so as to allow only linear motion of the cam follower pin 208 relative to the primary tilting arm 22 along the latter's longitudinal axis. To this effect, the connecting rod 202 comprises e.g. a guiding pin 212 engaged in a bushing 214 (only partially shown) that is attached to a suitable rectilinear sliding joint 216 (only partially shown). The bushing 214 also serves as abutment retaining the cam follower pin 206 in engagement with the cam groove 208. Whilst allowing shutter motion identical or similar to the previous embodiment, the cam groove 208 of the mechanism 200 provides additional flexibility in obtaining a desired shape of trajectory of the shutter 10.

As will be noted, the mechanisms 100, 200 described with respect to FIGS. 1-3 and FIG. 4 may readily be adapted for an arrangement using slightly unparallel axes 29, 39, arranged at an angle of e.g. 1-15° degrees. Such arrangement may be useful for instance in case of constructional constraints concerning the parking position of the shutter 10. In the latter case a globe-type or universal joint is used in place of e.g. the purely rotational first joints 104, 204 or instead of the rotational second joint 106.

Figure 5:
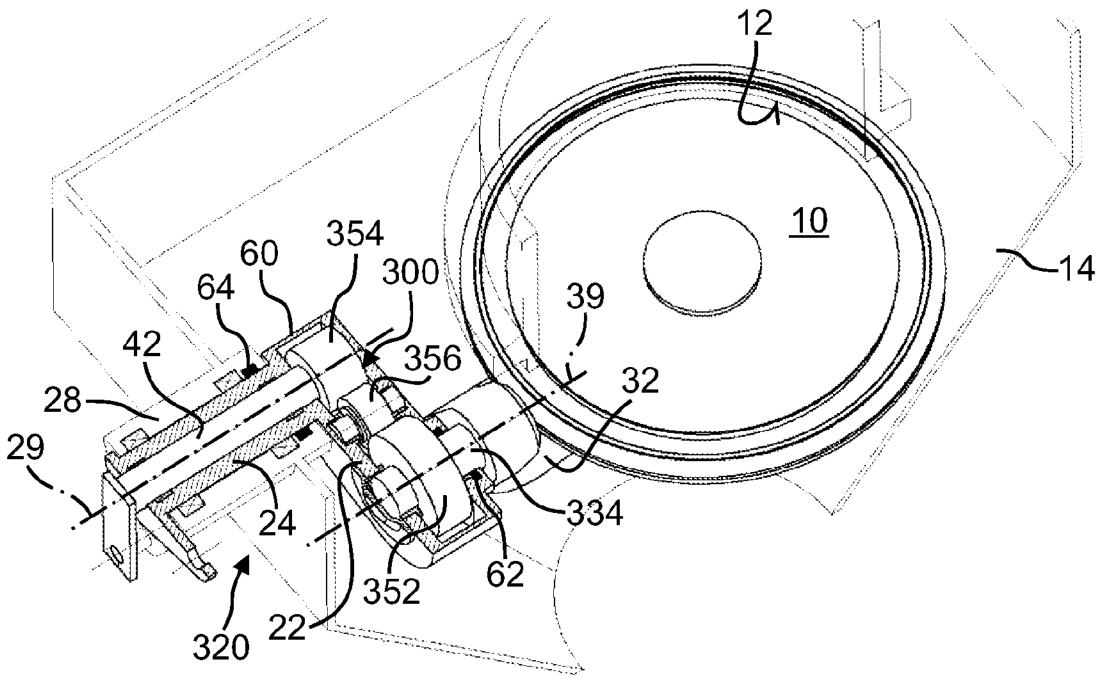
FIG. 5 is a perspective view in partial section, illustrating a third embodiment of a sealing valve arrangement with a further variant of dual-motion shutter-actuating device.
Figure 6:
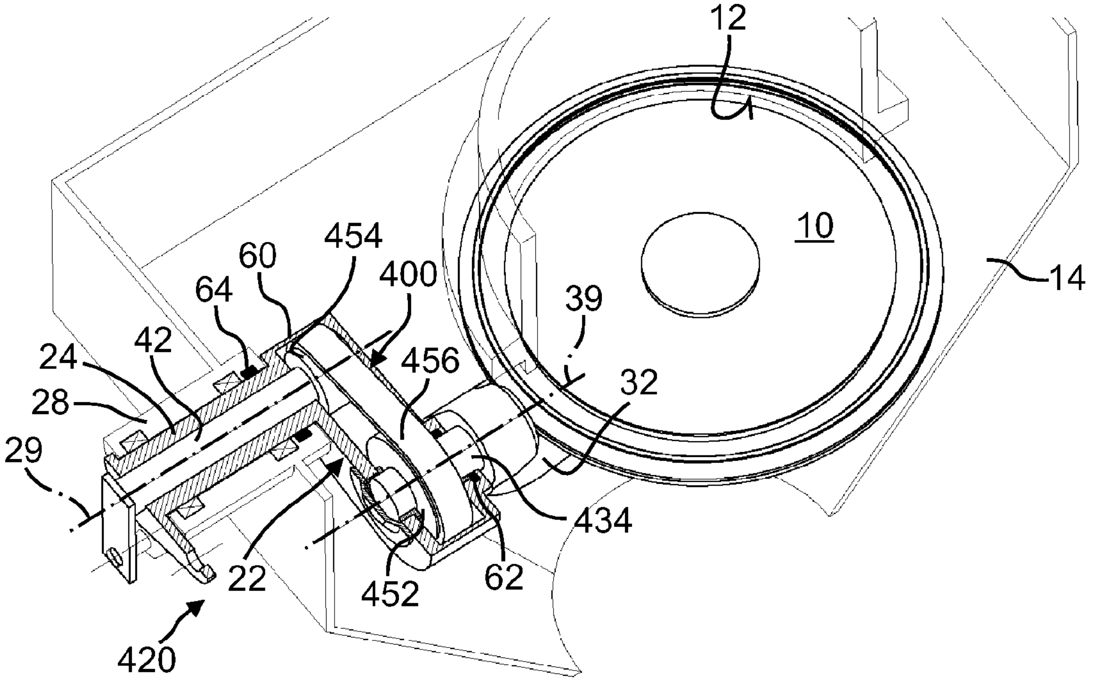
FIG. 6 is a perspective view in partial section, illustrating a fourth embodiment of a sealing valve arrangement with yet another variant of dual-motion shutter-actuating device.

FIGS. 5-6 respectively show two further embodiments of a dual-motion shutter-actuating device 320, 420, aspects of which that are identical to those described above will not be repeated. Both devices 320, 420 differ from the previous embodiments mainly in the configuration of their mechanisms 300, 400 for imparting secondary rotation to the secondary tilting arm 32. In both shutter-actuating devices 320, 420, the second tilting shaft 334, 434 is a simple continuous shaft (not a crankshaft) to which a respective driven wheel 352, 452 is fixed in rotationally stiff manner and coaxial to the second tilt axis 39. Furthermore, both shutter-actuating devices 320, 420 comprise a respective "driving" wheel 354, 454 fixed in rotationally stiff manner and coaxially to the first tilt axis 29 on the reference rod 42. Hence, the driving wheels 354, 454 are connected to the stationary structure, e.g. the lower sealing valve housing 14, with the proximal front face (not seen) of the reference rod 42 forming the reference member used as kinematic reference frame by the mechanisms 300, 400.

In the shutter-actuating device 320 of FIG. 5, the mechanism 300 for imparting rotation to the secondary tilting arm 32 is configured as gearwheel drive. Hence the driven wheel 352 and the driving wheel 354 are gearwheels. It comprises an intermediate gearwheel 356 that is rotatably supported by the primary tilting arm 22, e.g. by means of a shaft and bearing arrangement as seen in FIG. 5. The intermediate gearwheel 356 engages, i.e. meshes with the driven gearwheel 352 and the driving gearwheel 354. Accordingly, whenever the primary tilting arm 22 is driven, the mechanism 300 transmits counter-acting torque to the secondary tilting arm 32.

In the shutter-actuating device 420 of FIG. 6, the mechanism 400 for imparting rotation to the secondary tilting arm 32 is configured as belt-/chain type drive. Depending on whether a toothed-belt or a chain is used, the wheels 452, 454 are gearwheels or chain wheels. As seen in FIG. 6, the mechanism 400 thus comprises a toothed-belt or a chain 456 that engages the driven gear-/chain wheel 452 and the driving gear-/chain wheel 454. Accordingly, whenever the primary tilting arm 22 is driven, the mechanism 400 also transmits counter-acting torque to the secondary tilting arm 32.

Similar to the design parameters in the embodiments of FIGS. 1-4, the gear ratios in the embodiments of FIG. 5-6 are chosen to avoid collision of the shutter 10 with the seat 12 while moving the shutter 10 closely past the seat 12. Both embodiments of FIGS. 5&6 have the benefit of reducing the number of moveably parts (joints) used inside the support structure, i.e. the valve housing 14 or the intermediate hopper (not shown). It will be noted however that the embodiments of FIG. 5-6, in contrast to those of FIG. 1-3 & FIG. 4 do not allow superposing co-current tilting to the shutter 10 in a second phase of the opening motion.

All four embodiments described above employ cantilever-type primary and secondary arms 22, 32. Furthermore, they all employ a hollow sleeve shaft as first tilting shaft 24 with a coaxial reference rod 42 extending through the sleeve shaft 24 to provide a kinematic reference frame on the side of the shutter 10. A further common aspect lies in that the proposed shutter-actuating devices 20, 220, 320, 420 allow enclosing their respective mechanisms 100, 200, 300, 400 in a casing supported by the primary tilting arm 22 to protect the mechanism components against dust deposits and other adverse influences. As best seen in FIG. 2, each shutter-actuating devices 20, 220, 320, 420 comprises a casing envelope 60 of any suitable shape supported by the main elongated plates or flanges of the fork-shaped primary tilting arm 22. To further protect the mechanism components, each embodiment is equipped with a first sealing packing 62 in the bore of the primary tilting arm 22 (or in the casing envelope 60) through which the second tiling shaft 34, 334, 434 passes on the side of the shutter 10. The first sealing packing 62, best seen in FIG. 2, seals the interior of the casing envelope 60 against the region surrounding the shutter 10 and precludes escape of furnace gas through this bore. In addition, a second sealing packing 64 is provided in between the first tilting shaft 24 and the cylindrical support 28 to avoid escape of furnace gas through this passage.

A further noteworthy common feature, is that each mechanism 100, 200, 300, 400 has its driving side in engagement with the second tilting shaft 34 for driving the second tilting shaft 34 to impart secondary rotation to the secondary tilting arm 32. This feature—in combination with the hollow shaft 24 and the coaxial reference rod 42—enables encasing the mechanism components, e.g. by means of a casing envelope 60 as shown in FIGS. 1-6.

The invention claimed is:

1. A sealing valve arrangement for a shaft furnace charging installation, said arrangement comprising:

a shutter that cooperates with a valve seat;

a dual-motion shutter-actuating device for moving said shutter between a closed position in sealing contact with the valve seat and an open position remote from the valve seat, said shutter-actuating device being configured to confer to said shutter a superposition of a first rotation about a first axis and a second rotation about a second axis that is substantially parallel and offset with respect to said first axis, said shutter-actuating device comprising:

a primary tilting arm connected to a first tilting shaft that defines said first axis and is equipped with bearings to rotatably support said primary tilting arm on a stationary structure, a secondary tilting arm connected to a second tilting shaft that defines said second axis and is equipped with bearings that rotatably support said secondary tilting arm on said primary tilting arm, said secondary tilting arm carrying said shutter; and a mechanism configured to impart rotation about said second axis to said secondary tilting arm when said primary tilting arm rotates about said first axis;

wherein said first tilting shaft is configured as a hollow sleeve shaft and said shutter-actuating device comprises a reference rod extending through said first tilting shaft, said reference rod having a distal end portion to be connected to a stationary structure and a proximal end portion with a reference member, said mechanism having a driven side that is in engagement with said reference member.

2. The sealing valve arrangement according to claim 1, wherein said secondary tilting arm is a cantilever arm that is supported at only one end portion by said second tilting shaft and said primary tilting arm is a cantilever arm that is supported at only one end portion by said first tilting shaft.

3. The sealing valve arrangement according to claim 1, wherein said reference rod is a cylindrical shaft that is coaxially supported inside said first tilting shaft by means of axially spaced bearings.

4. The sealing valve arrangement according to claim 1, wherein said mechanism has a driving side that is in engagement with said second tilting shaft for driving said second tilting shaft to impart rotation about said second axis to said secondary tilting arm, said secondary tilting arm being fixed in rotationally stiff manner to said second tilting shaft.

5. The sealing valve arrangement according to claim 1, wherein said shutter-actuating device comprises a casing supported by said primary tilting arm and enclosing said mechanism, said second tilting shaft passing through a bore in said primary tilting arm or in said casing and said bore being equipped with a seal that seals the interior of said casing against a region surrounding the shutter.

6. The sealing valve arrangement according to claim 1, wherein said second tilting shaft is configured as a crankshaft and said mechanism comprises a connecting rod with a first end portion that is rotatably connected to said crankshaft for imparting rotation about said second axis to said secondary tilting arm.

7. The sealing valve arrangement according to claim 6, wherein said connecting rod has a second end portion that is rotatably connected to a reference pivot pin, said pivot pin being arranged eccentrically with respect to said first axis, and fixed on said reference member.

8. The sealing valve arrangement according to claim 6, wherein said connecting rod has a second end portion that comprises a cam follower pin that is guided in a reference cam groove provided in said reference member, said reference cam groove having a curved contour that increases the distance between said cam follower pin and said first axis during an initial phase of motion from the closed to the open position.

9. The sealing valve arrangement according to claim 8, wherein said mechanism comprises a linear guide arranged on said primary tilting arm, said linear guide maintaining said cam follower pin in engagement in said reference cam groove and guiding said second end portion of said connecting rod so as to constrain motion of said cam follower pin relative to said primary tilting arm to a linear motion.

10. The sealing valve arrangement according to claim 1, wherein said mechanism comprises a driven wheel fixed coaxially to said second axis on said second tilting shaft and a driving wheel fixed coaxially to said first axis on said reference member.

11. The sealing valve arrangement according to claim 10, wherein said mechanism is configured:

- as a gearwheel drive, said driven wheel and said driving wheel being gearwheels, and said mechanism comprises an intermediate gearwheel rotatably supported by said primary tilting arm and engaging said driving gearwheel and said driven gearwheel; or
- as a belt/chain drive and comprises a belt or chain engaging said driving wheel and said driven wheel.

12. The sealing valve arrangement according to claim 1, further comprising only one actuator, said actuator being connected to said first tilting shaft for imparting rotation about said first axis to said primary tilting arm.

13. The sealing valve arrangement according to claim 1, wherein said primary tilting arm is fork-shaped having two spaced-apart elongated parallel plates, each supporting one of two axially spaced bearings of said second tilting shaft, said mechanism being arranged in between said two plates; and/or wherein said secondary tilting arm is L-shaped and has a first end portion that is fixed in rotationally stiff manner to said second tilting shaft and a second end portion equipped with a globe joint through which said shutter is mounted to said secondary tilting arm.

14. Lower sealing valve housing for a blast furnace charging installation, said housing comprising

- a sealing valve arrangement, and;
- a valve seat supported by said housing;
- wherein said sealing valve arrangement comprises:
  - a shutter that cooperates with said valve seat;
  - a dual-motion shutter-actuating device for moving said shutter between a closed position in sealing contact with the valve seat and an open position remote from the valve seat, said shutter-actuating device being configured to confer to said shutter a superposition of a first rotation about a first axis and a second rotation about a second axis that is substantially parallel and offset with respect to said first axis, said shutter-actuating device comprising:
    - a primary tilting arm connected to a first tilting shaft that defines said first axis and is equipped with bearings to rotatably support said primary tilting arm on a stationary structure;
    - a secondary tilting arm connected to a second tilting shaft that defines said second axis and is equipped with bearings that rotatably support said secondary tilting arm on said primary tilting arm, said secondary tilting arm carrying said shutter; and
    - a mechanism configured to impart rotation about said second axis to said secondary tilting arm when said primary tilting arm rotates about said first axis;
- wherein said first tilting shaft is configured as a hollow sleeve shaft and said shutter-actuating device comprises a reference rod extending through said first tilting shaft, said reference rod having a distal end portion to be connected to a stationary structure and a proximal end portion with a reference member, said mechanism having a driven side that is in engagement with said reference member; and
- wherein said dual-motion shutter-actuating device is configured such that said first axis is arranged above the plane of said valve seat and such that said first and second axes are located in a plane parallel to the plane of said valve seat when said shutter is in said closed position in sealing contact with said valve seat.

15. Intermediate storage hopper for a blast furnace charging installation, said hopper comprising

- a sealing valve arrangement and;
- a valve seat that is supported by said hopper to communicate with an upper inlet;
- wherein said sealing valve arrangement comprises:
  - a shutter that cooperates with said valve seat;
  - a dual-motion shutter-actuating device for moving said shutter between a closed position in sealing contact with the valve seat and an open position remote from the valve seat, said shutter-actuating device being configured to confer to said shutter a superposition of a first rotation about a first axis and a second rotation about a second axis that is substantially parallel and offset with respect to said first axis, said shutter-actuating device comprising:
    - a primary tilting arm connected to a first tilting shaft that defines said first axis and is equipped with bearings to rotatably support said primary tilting arm on a stationary structure;
    - a secondary tilting arm connected to a second tilting shaft that defines said second axis and is equipped with bearings that rotatably support said secondary tilting arm on said primary tilting arm, said secondary tilting arm carrying said shutter; and a mechanism configured to impart rotation about said second axis to said secondary tilting arm when said primary tilting arm rotates about said first axis;

wherein said first tilting shaft is configured as a hollow sleeve shaft and said shutter-actuating device comprises a reference rod extending through said first tilting shaft, said reference rod having a distal end portion to be connected to a stationary structure and a proximal end portion with a reference member, said mechanism having a driven side that is in engagement with said reference member; and wherein said dual-motion shutter-actuating device is configured such that said first axis is arranged above the plane of said valve seat and such that said first and second axes are located in a plane parallel to the plane of said valve seat when said shutter is in said closed position in sealing contact with said valve seat.

16. The sealing valve arrangement according to claim 2, wherein said reference rod is a cylindrical shaft that is coaxially supported inside said first tilting shaft by means of axially spaced bearings.

17. The sealing valve arrangement according to claim 2, wherein said mechanism has a driving side that is in engagement with said second tilting shaft for driving said second tilting shaft to impart rotation about said second axis to said secondary tilting arm, said secondary tilting arm being fixed in rotationally stiff manner to said second tilting shaft.

18. The sealing valve arrangement according to claim 16, wherein said mechanism has a driving side that is in engagement with said second tilting shaft for driving said second tilting shaft to impart rotation about said second axis to said secondary tilting arm, said secondary tilting arm being fixed in rotationally stiff manner to said second tilting shaft.

19. The sealing valve arrangement according to claim 2, wherein said shutter-actuating device comprises a casing supported by said primary tilting arm and enclosing said mechanism, said second tilting shaft passing through a bore in said primary tilting arm or in said casing and said bore being equipped with a seal that seals the interior of said casing against a region surrounding the shutter.

20. The sealing valve arrangement according to claim 3, wherein said shutter-actuating device comprises a casing supported by said primary tilting arm and enclosing said mechanism, said second tilting shaft passing through a bore in said primary tilting arm or in said casing and said bore being equipped with a seal that seals the interior of said casing against a region surrounding the shutter.

* * * * *